No. 851,593. PATENTED APR. 23, 1907.
J. A. H. HATT.
CAMERA.
APPLICATION FILED FEB. 10, 1906.
2 SHEETS—SHEET 1.
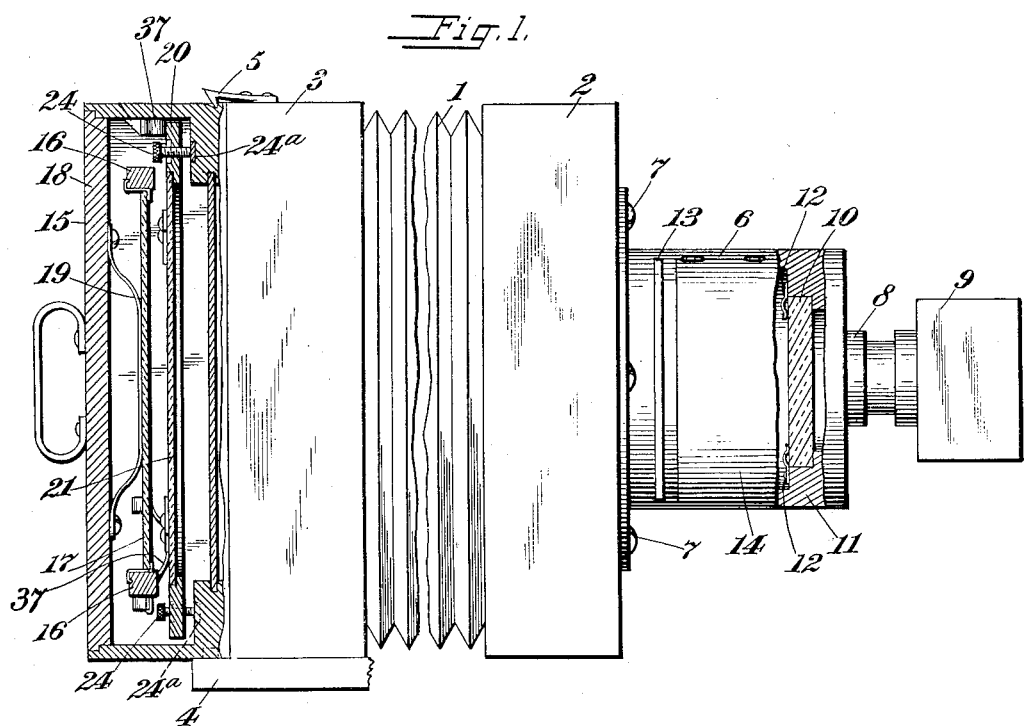
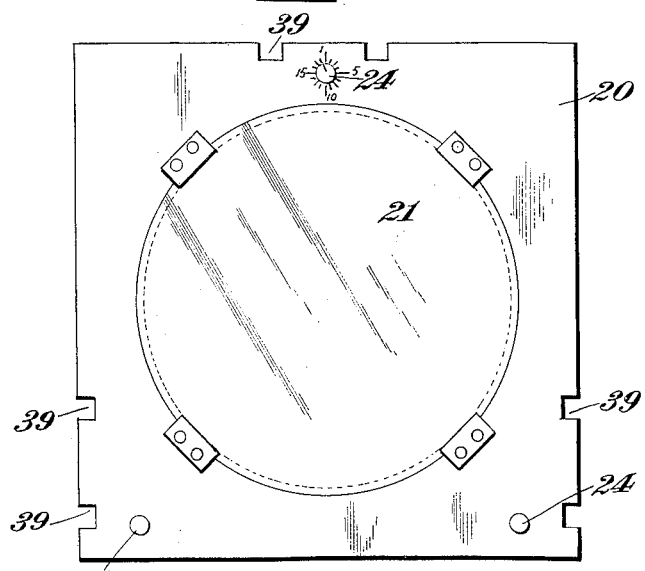
Witnesses:
J. G. Coffin
Augusta L. Saltzman
Inventor:
J. A. H. Hatt
By John D. Morgan
Attorney.

No. 851,593. PATENTED APR. 23, 1907.
J. A. H. HATT.
CAMERA.
APPLICATION FILED FEB. 10, 1906.
2 SHEETS—SHEET 2.
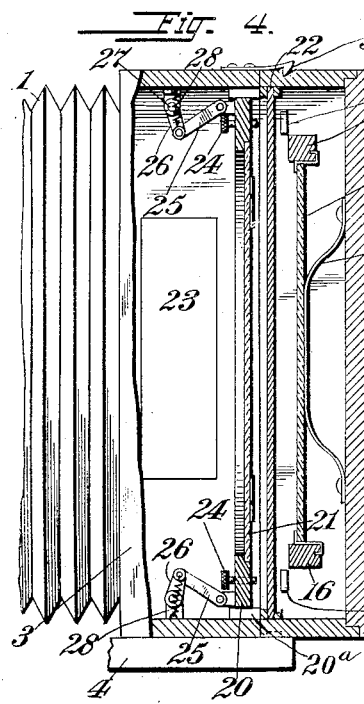
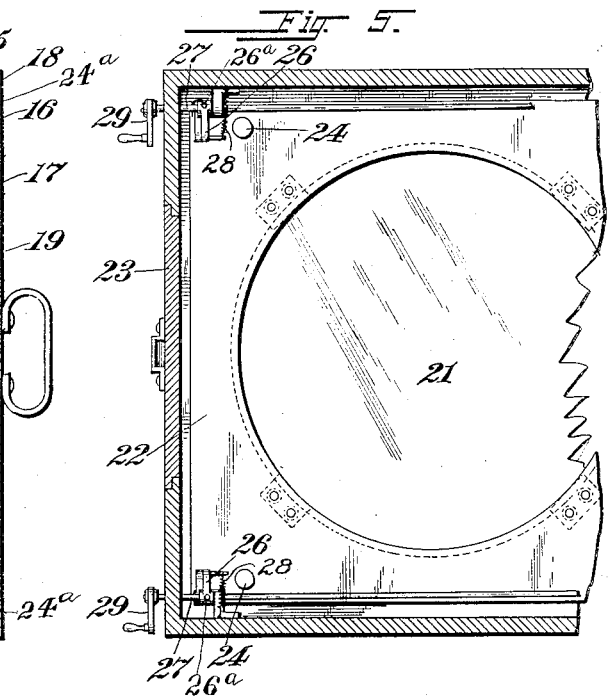
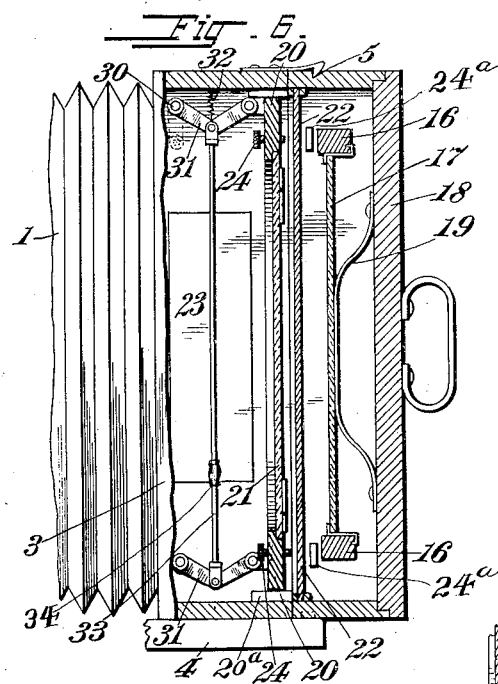
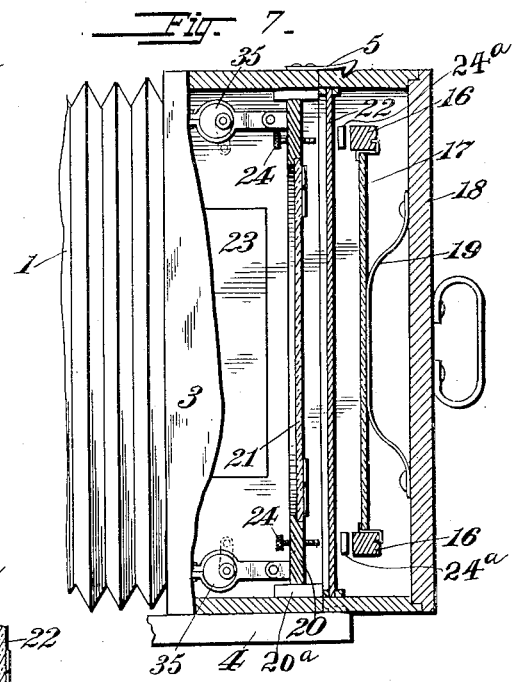
Witnesses:
J. G. Coffin.
Augusta L. Saltzman.
Inventor,
J. A. H. Hatt
By John D. Morgan
Attorney.

UNITED STATES PATENT OFFICE.

JOSEPH ARTHUR HENRY HATT, OF BROOKLYN, NEW YORK.

CAMERA.

No. 851,593.  Specification of Letters Patent.  Patented April 23, 1907.

Application filed February 10, 1906. Serial No. 300,371.

*To all whom it may concern:*

Be it known that I, JOSEPH ARTHUR HENRY HATT, a citizen of the United States, residing at Brooklyn, in the State of New York, have invented new and useful Improvements in Cameras, of which the following is a specification.

The invention relates to cameras, and more particularly to cameras such as are used in the photomechanical engraving processes, although the invention in certain of its features is applicable to cameras generally.

Objects of the invention are to provide a camera with a simple and convenient arrangement of parts; in which access is readily had to removable and adjustable parts, and the adjustment or insertion or removal of parts may be effected with facility, ease, rapidity and certainty; in which the passage of light is so controlled that the various parts may be adjusted, inserted, or removed without inconvenience and without special care or labor being bestowed upon other parts to protect them from the action of light; to provide simple, reliable and accurate adjustment for the ruled screen, and to provide for all portions of the screen being positively positioned with reference to the sensitized plate. These and other objects of invention will in part be obvious and in part will more fully appear hereinafter.

The invention consists in the novel parts, articles, arrangements, combinations and improvements herein set forth.

The accompanying drawings, referred to herein and forming a part hereof, illustrate one embodiment of the invention and serve in connection with the description herein to explain the principles thereof.

Of the drawings: Figure 1 is a side elevation, with parts in section and parts broken away, of a camera constructed in accordance with certain features of the invention; Fig. 2 is an elevation of one form of screen holder; Fig. 3 is a detail view partly in section of a form of retaining device for the screen holder; Figs. 4 to 7 inclusive are elevations, partly in section, of portions of a camera; Fig. 5 being a central section of Fig. 4 looking toward the right; and Fig. 8 is a detail view partly in section of a modified form of the correspondingly numbered parts as shown in Fig. 6 or 7.

Referring to the particular embodiment of the invention illustrated by way of example in the accompanying drawings, the said embodiment will be seen to comprise a camera having a lens mounted at the front thereof, and mounted in convenient relation to the lens a color filter, such as is used in various branches of photography but principally in what is known as color process work. The lens and color filter may be mounted in different arrangements as may be found convenient, but as shown herein the color filter is arranged back of the lens and within the camera. In the said drawings the body of the camera is indicated by the reference numeral 1 and the front board by the reference numeral 2. Suitable means for properly positioning a sensitized plate with reference to the lens are provided, and said means may be of any suitable and convenient form, so far as concerns many features of the invention. As shown in the drawings herewith the plate is received at the rear 3 of the camera, the camera being provided with means for receiving a plate holder, said means comprising a ledge 4 and spring hook 5. The lens and the color filter may be carried detachably attached to the camera and they are so shown in the drawings. As illustrated, an auxiliary chamber 6 is shown detachably attached to the front board 2 in any convenient manner, as by a series of screws 7. At the front of the said chamber is carried a lens 8 and when desired a reversing prism may be used in conjunction therewith. A prism 9 is accordingly shown mounted in front of the lens. In the drawings a color filter 10 is shown mounted within the chamber 6, a suitable support 11 for removably supporting the color filter in proper relation to the lens being provided. Any suitable devices for holding the color filter in position on its support may be used, and a form of such means is shown in the drawings as comprising spring clips 12. In order that these parts may be put on or taken off or adjusted without affecting the plate, means are provided, arranged intermediately of the plate holder and the light-transmitting devices, such as the lens and color filter, for controlling the passage of light. As illustrated in the drawings a dark shutter is provided for the purpose indicated, located in the chamber 6 between the color filter and lens on the one hand and the body of the camera on the other. Such dark shutter may be of any convenient form for arresting or permitting the passage of light and is shown herein as a slide 13 arranged to entirely cut off the chamber 6 when closed.

Means are provided for permitting access to the interior of the chamber 6 so as to permit of adjustment or insertion or removal of the color filter or other parts which may be located within the chamber and a form of such means is herein shown as comprising a light-tight door 14 in the side of the chamber 6. The said door may be mounted in any suitable manner and as illustrated herewith it is shown as mounted upon suitable hinges at the top edge thereof, and when opened upwardly will remain open without any fastenings. By this arrangement it will be seen that when the dark shutter 13 is closed the door 14 may be opened without permitting light to pass into the body of the camera. While the chamber 6 is shown herein of cylindrical form, it will be obvious that it might be of a rectangular form where convenient. Also, if desired, the color filter may be arranged to slide on edge into its support. The particular form of the said parts, or the use of certain of the said parts, is not material so far as regards the features of invention claimed in the present application.

As illustrated herein the rear of the camera is provided with means for taking a plate holder 15 adapted for holding a sensitized plate. The holding means for the plate may be of any desired or convenient form and are shown as comprising two horizontal, parallel bars 16 which are spaced and arranged to hold the size of plate desired. The supports and adjustments therefore are omitted in the drawings for the sake of clearness. A sensitized plate 17 is shown supported in the said holding means 16. The rear end of the plate holder is shown as a detachable light-tight door 18 which may be attached and detached in any suitable manner. The said door is shown as provided with a spring 19 which serves to hold the plate to position in the holder.

It will be understood that the adjustment and positioning of the ruled or "half-tone" screen is exceedingly important, in fact vital, to the production of good photomechanical work. Upon these things depend to a very great extent the quality of the negatives and consequently of the printing plates. The adjustment devices should permit of a very fine and accurate adjustment of the screen so as to secure the exact grain or stipple effect desired, and it is also very important that the entire surface of the screen be positioned exactly and uniformly in accordance with the adjustment so that a uniform effect will be obtained over the entire surface of the negative. It will also be obvious that devices of simple and reliable construction are necessary in order to realize the requirements just indicated. This invention contemplates, in accordance with certain of its features, the providing of adjusting and positioning means of the character indicated and capable of effecting the results desired.

In the illustrated embodiment of such means there are provided a plurality of adjusting screws and bearing plates therefor, one of said members being carried on the screen holder and the other in a definite relation to the sensitized plate. Pressure exerting means for pressing each screw into positive contact with its bearing plate are also provided. The said adjusting screws are arranged substantially symmetrically about the screen. It will thus be seen that a fine and accurate adjustment is provided, and that each part of the screen is positioned with exactness in its adjusted position.

In the form of adjusting means for the screen shown in the illustrated embodiment, the ruled or half-tone screen 21 is carried in a suitable holder 20. The adjusting means for the screen holder, as heretofore indicated, comprise adjusting screws and bearing plates therefor, and as shown the adjusting screws, indicated by reference numeral 24, are carried in the screen holder, and the bearing plates therefor $24^a$ are carried within the plate holder 5, and in a definite relation to the sensitized plate 17. So far as certain features of the invention are concerned, the positions of the adjusting screws and bearing plates may be reversed, it being only essential in such case that one be carried by the screen holder and the other be in a definite relation to the sensitized plate. The number of adjusting screws and bearing plates may be varied, and in Figs. 1 and 2 three screws and plates are shown mounted in the screen holder 20, while in Figs. 4 to 7 the screen holder is shown as carrying four screws and plates, arranged at the corners of the screen holder. The adjusting screws may be provided with a graduated dial for determining the adjustment as shown at the top of Fig. 2, or the adjustment may be effected by placing a calipering device between the bearing plate and screen holder, and then bringing the screws into position against the bearing plate.

With a view to always bringing all parts of the screen positively into proper position with respect to the plate, means for holding each of the adjusting screws 24 firmly to position are provided and the form of such means shown herein comprises springs or other resilient members by which a separate pressure may be applied to each screw against its bearing plate.

In connection with Fig. 1 of the drawings an embodiment of mechanism is shown in which the adjusting means and the means for holding the screen to adjusted position are shown as being carried entirely within the plate holder. As shown in the said figure the screen holder is mounted within the plate holder 15 the adjusting screws 24 being held to their bearing plates $24^a$ by suitable resilient members having such relation to the adjusting screws that each is held firmly to its bearing plate so as to retain the screen in its proper position with reference to the sensitized plate 17. As shown herein the said resilient members consist of bow springs 37 bearing upon the screen holder, a plurality thereof being shown, one adapted to bear on the screen holder adjacent to each of the adjusting screws 24. The particular form of mechanism illustrated in the said figure permits of the screen holder going into the plate holder previous to the insertion of the sensitized plate and the spring members are then inserted in order to hold the screen holder to position irrespective of the handling of the plate holder. With the form of springs illustrated they are adapted to pass between the screen holder 21 and bearing lugs 38 carried in the side of the plate holder. Where the screen holder in any of its dimensions fills the plate holder, recesses 39 may be provided for permitting the screen holder to pass the lugs.

In certain cases it may be desirable to carry the half-tone screen permanently in the camera, as for instance when a screen of large size is used. Such a screen is of considerable weight and is also costly and fragile so that it is undesirable to handle it more than is necessary. In the drawings herewith, accordingly, a structure adapted for the said purpose is shown. In Figs. 4 to 7 of the drawings is illustrated a form of means combining the functions of moving the screen mounted within the camera toward and from the plate carried in the plate holder, and accurately positioning the screen with reference to the plate, by holding each of the adjusting screws to its bearing. With regard to certain features of the invention, it will be understood that it is immaterial whether these functions be combined in a single mechanism or not. In Fig. 4 of the drawings an embodiment of one form of such means is illustrated, wherein the screen holder is shown connected by pivoted links 25 to crank arms 26 carried by a rotatable shaft 27, a link and crank arm being carried preferably at each side of the screen holder. Suitably mounted in connection with the mechanism just described is a resilient member 28 shown in the form of a spiral spring so mounted with reference to the shaft 27 that it will hold the crank yieldingly but firmly in position on either side of the center. This device, as will be understood, tends to hold the screen holder in the retracted or in the forward position and tends to press each of the adjusting screws firmly against its bearing plate so as to secure a proper positioning of the screen. Means for actuating the device just described from the exterior of the camera are provided and are shown as crank handles 29 connected to the shafts 27. Where more than one crank arm 26 is carried by a shaft 27, the crank arms may be made angularly adjustable about the shaft so as to compensate for any difference in the connections that may be required to bring each adjusting screw to its bearing plate. The crank arms may be made adjustable by means of a set screw such as is shown at 26ª.

In Fig. 6 of the drawings a mechanism is shown for controlling the movement and positioning of the screen holder which is connected so as to be actuated by a single exteriorly located actuating means. The connections between the actuating shaft and the screen holder, designated in the said figure by the reference numeral 30, are in the form of toggles 31, and a suitable spring 32 is shown connected to the toggle lever for holding the screen holder to position in operative relation to the sensitized plate 17. The various toggles are shown as connected by a connecting rod, or rods, 33, one such rod being shown as having a turnbuckle 34 for providing adjustment so as to cause each adjusting screw to rest firmly on its bearing plate.

In Fig. 7 of the drawings the screen holder is shown as linked to eccentrics 35 for the purpose of giving the desired movement to the screen. The said eccentrics may move with sufficient friction so as to hold the screen firmly to position while still not offering any appreciable resistance to their actuation by hand. The eccentric straps are shown adjustable, and the eccentrics may also be adjustable on their shaft, if desired.

The screen holder in the said constructions shown in Figs. 4, 5, 6 and 7 is shown as resting upon ways or tracks 20ª which serve to hold it to position laterally while permitting of its free movement longitudinally or toward and from the plate. In Fig. 8 of the drawings is shown a construction wherein the screen holder 20 is carried in a secondary holder 20ᵇ, which carries the adjusting screws 24 and to which the moving means for the screen holder are attached. This construction provides for a rapid and easy way of substituting one screen for another in the camera.

In the structure shown in Figs. 4 to 7 of the drawings there is also shown an embodiment and arrangement of means for permitting of the adjustment of the screen and also of the removal of one screen and of the substitution of another in cases where such adjustment or substitution is desired while the plate holder is on the camera, without removing the plate holder and without subjecting the plate to the action of light. In the said embodiment light-arresting means are shown interposed between the screen in its retracted position and the plate for the protection of the plate from light, and a door is provided giving access to the screen, the screen holder and their connections. This is shown in connection with a screen carried in the camera. Between the screen holder and screen in their retracted position and the plate is shown the dark slide 22 of the plate holder, which is utilized for the light-arresting means between the screen and plate. Conveniently arranged with reference to the screen holder 20 and its associated parts, on the other side of the dark slide 22 from the sensitized plate and at one side of the camera, is arranged the door 23. When the slide is in position, the door 23 can be opened and the screen adjusted either by rotation in its holder or to change its distance from the sensitized plate during a further exposure of the plate, or if desired, a new screen may be substituted for the one previously used, or for any other purpose.

The operation and manipulation of the various devices herein shown and described will be clearly understood from the foregoing, and it will be further understood that mechanisms and devices have been provided realizing the objects of invention and advantages herein set forth, together with other objects and advantages.

I wish it to be understood that I do not desire to be limited to the exact details of construction shown and described, for obvious modifications will occur to a person skilled in the art.

What I do claim as my invention and desire to secure by Letters Patent, is:

1. The combination with a plate holder of a support for a sensitized plate within the holder, a support for a screen holder, and a plurality of adjusting screws mounted upon one of said supports so as to regulate the distance between the screen and the sensitized plate.

2. The combination with a plate holder of a support for a sensitized plate within the holder, a support for a screen holder, a plurality of adjusting screws mounted upon one of said supports, and means upon the other support with which each adjusting screw coacts so as to determine the position of the plate and the screen with reference to each other.

3. The combination with a plate holder of a support for a sensitized plate within the holder, a support for a half-tone screen, an adjusting screw carried upon one of said supports, a bearing plate for the screw upon the other support, and means for holding the screw to its bearing plate.

4. The combination with a plate holder of means for supporting and positioning a sensitized plate within the holder, a movable screen holder, a plurality of adjusting screws arranged substantially symmetrically about the screen in the screen holder, a bearing plate for each screw arranged in a definite relation to the plate, and means for holding each screw to its bearing plate.

5. The combination with a plate holder of means for supporting and positioning a sensitized plate within the holder, a movable screen holder, a plurality of adjusting screws arranged substantially symmetrically about the screen in the screen holder, a bearing plate for each screw arranged in a definite relation to the plate, and yielding means for holding each screw to its bearing plate.

6. The combination with a plate holder of means for supporting and positioning a sensitized plate within the holder, a movable screen holder, and adjusting means comprising a plurality of adjusting screws and a bearing plate for each screw, the said parts being arranged substantially symmetrically with reference to the screen holder, one of said parts being carried by the screen holder and the other being in a definite position with reference to the plate.

7. The combination with a plate holder of a support for a plate in said holder, a support for a screen, an adjusting screw carried by one of the said supports, a bearing plate for the said screw carried by the other of said supports, and means for moving the two supports relatively to each other so as to bring the screw and its bearing plate into contact to regulate the distance between the screen and the plate.

8. The combination with a plate holder of a support for a plate in said holder, a support for a screen, a plurality of adjusting screws carried by one of the said supports, bearing plates for the said adjusting screws carried by the other of said supports, means for moving the two supports relatively to each other so as to bring the screws and their bearing plates into contact to regulate the distance between the screen and the plate, and means for yieldingly pressing each screw to its bearing plate.

9. A camera including in combination a plate holder, means for supporting and positioning a plate within the holder, means for holding the plate holder to the body of the camera, a holder for a half-tone screen located within the body of the camera, adjusting means for said screen holder, actuating means for moving the screen holder toward and from the plate, and a dark slide arranged between the plate in the plate holder and the screen holder when in its retracted position.

10. The combination with a plate holder of a movable screen holder, a plurality of adjusting screws arranged in said holder substantially symmetrically about the screen, bearing plates for the said adjusting screws, means for yieldingly pressing each screw to its bearing plate and means for moving the screen holder toward and away from the plate.

11. A camera including in combination a plate holder, means for supporting and positioning a plate within the holder, means for holding the plate holder to the body of the camera, a holder for a half-tone screen located within the body of the camera, adjusting means for said screen holder, actuating means for moving the screen holder toward and from the plate, a doorway in the camera for giving access to said screen holder, and a dark slide arranged between the plate in the plate holder and the screen holder when in its retracted position.

12. A camera including in combination a plate holder, means for supporting and positioning a plate within the holder, means for holding the plate holder to the body of the camera, a holder for a half-tone screen located within the body of the camera, adjusting means for said screen holder, actuating means for moving the screen holder toward and from the plate, holding means for said screen holder to which the said adjusting means and said actuating means are attached, a doorway in the camera for giving access to said screen holder, and a dark slide arranged between the plate in the plate holder and the screen holder when in its retracted position.

In testimony whereof I have signed my name to this specification in the presence of two subscribing witnesses.

JOSEPH ARTHUR HENRY HATT.

Witnesses:
 JOHN D. MORGAN,
 F. C. LUCAS.